United States Patent
Sugimoto et al.

(10) Patent No.: US 7,750,524 B2
(45) Date of Patent: Jul. 6, 2010

(54) SUPERCONDUCTOR MAGNETIZING DEVICE AND SUPERCONDUCTING SYNCHRONIZATION DEVICE

(75) Inventors: Hidehiko Sugimoto, Aichi (JP); Mitsuru Izumi, Tokyo (JP); Masahiro Kitano, Tokyo (JP)

(73) Assignees: University of Fukui, Fukui-shi (JP); Tokyo University of Marine Science and Technology, Tokyo (JP); Kitano Seiki Co., Ltd., Tokyo (JP)

(*) Notice: Subject to any disclaimer, the term of this patent is extended or adjusted under 35 U.S.C. 154(b) by 877 days.

(21) Appl. No.: 10/541,587

(22) PCT Filed: Jul. 15, 2003

(86) PCT No.: PCT/JP03/08963

§ 371 (c)(1),
(2), (4) Date: Nov. 16, 2005

(87) PCT Pub. No.: WO2004/022410

PCT Pub. Date: Mar. 18, 2004

(65) Prior Publication Data

US 2006/0166832 A1    Jul. 27, 2006

(30) Foreign Application Priority Data

Jan. 9, 2003    (JP) .............................. 2003-003443

(51) Int. Cl.
*H02K 55/02* (2006.01)
*H01F 6/00* (2006.01)

(52) U.S. Cl. ................. 310/162; 505/166; 505/211; 505/876; 505/879; 335/216; 335/284

(58) Field of Classification Search ............... 335/216, 335/284; 310/52–57, 162; 505/166, 211–213, 505/876, 879
See application file for complete search history.

(56) References Cited

U.S. PATENT DOCUMENTS

| 3,098,189 | A | * | 7/1963 | Buchhold | .................. 330/8 |
| 3,564,307 | A | * | 2/1971 | Kawabe et al. | .................. 310/10 |
| 3,611,113 | A | * | 10/1971 | Cherry | .................. 322/48 |
| 3,673,444 | A | * | 6/1972 | Kawabe et al. | .................. 310/10 |

(Continued)

FOREIGN PATENT DOCUMENTS

JP    47-39641    10/1972

(Continued)

*Primary Examiner*—Ramon M Barrera
(74) *Attorney, Agent, or Firm*—Oblon, Spivak, McClelland, Maier & Neustadt, L.L.P.

(57) ABSTRACT

A magnetizing device for superconductor and a superconducting synchronous machine are provided capable of constituting more compact and simple equipment that uses a superconductor as a magnet. The magnetizing device for superconductor includes a superconductor (131); a coolant chamber (142) for cooling the superconductor (131) down to or below a critical temperature at which the transition to a superconducting state occurs; coils (111, 111') for generating a magnetic field equal to or higher than a critical magnetic field in which the intrusion of a magnetic flux into the superconductor (131) starts, around the superconductor (131) cooled down to or below the critical temperature at which the transition to the superconducting state occurs; and position modification means capable of arranging the superconductor (131) on a disk (120) and modifying the relative positional relationship with the coils (111, 111').

8 Claims, 10 Drawing Sheets

U.S. PATENT DOCUMENTS

| | | | |
|---|---|---|---|
| 5,138,207 A | * | 8/1992 | Hilal et al. .................... 310/46 |
| 5,177,054 A | * | 1/1993 | Lloyd et al. ................. 505/166 |
| 5,659,278 A | | 8/1997 | Yanagi et al. |
| 6,111,490 A | * | 8/2000 | Yanagi et al. ............... 335/216 |

FOREIGN PATENT DOCUMENTS

| | | |
|---|---|---|
| JP | 7-170721 | 7/1995 |
| JP | 7-312885 | 11/1995 |

* cited by examiner

SUPERCONDUCTOR MAGNETIZING DEVICE AND SUPERCONDUCTING SYNCHRONIZATION DEVICE

TECHNICAL FIELD

The present invention relates to a magnetizing device for magnetizing a superconductor, and a superconducting synchronous machine.

BACKGROUND ART

Figure 1:
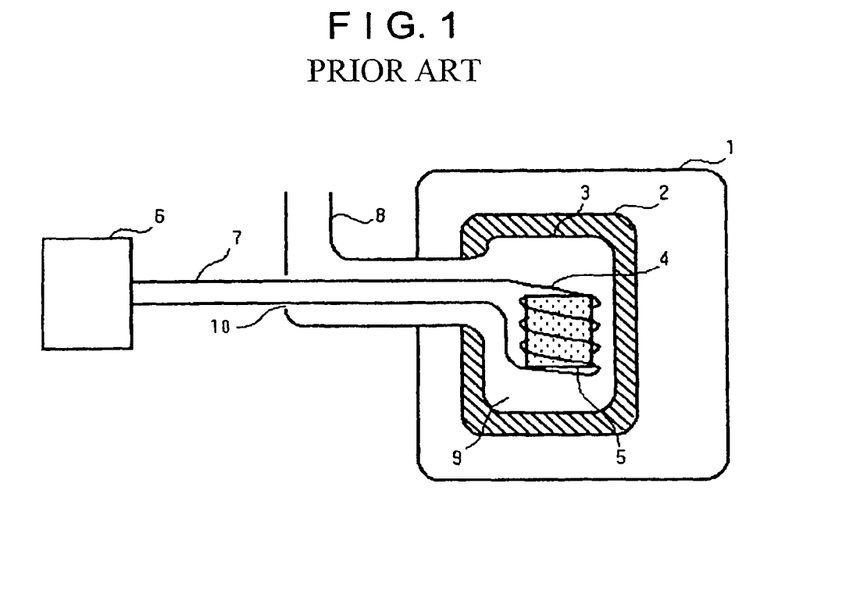
FIG. 1 is a constructional view of a conventional magnetizing device (example 1) for superconductor.

FIG. 1 is a constructional view of a conventional magnetizing device (example 1) for superconductor.

In FIG. 1, reference numeral 1 denotes equipment using a superconductor as a magnet; numeral 2 denotes a vacuum container provided in the equipment 1; numeral 3 denotes a coolant container provided in the vacuum container 2; numeral 4 denotes a coil installed in the coolant container 3; numeral 5 denotes a superconductor arranged in the hollow portion of the coil 4; numeral 6 denotes a power source provided outside the equipment 1; numeral 7 denotes a connection line for interconnecting the coil 4 and the power source 6; numeral 8 denotes coolant piping connected to the coolant container 3; and numeral 9 denote liquid nitrogen poured into the coolant container 3 through the coolant piping 8. Here, reference numeral 10 denotes a penetrating portion provided in the coolant piping 8, and the above-described connection line 7 interconnects the coil 4 and the power source 6 through the penetrating portion.

The superconductor 5 is cooled down to and below a critical temperature at which the transition to a superconducting state occurs, using the liquid nitrogen 9 introduced to the coolant container 3 through the coolant piping 8. In this situation, a current is fed from the power source 6 to the coil 4 through the connection line 7. At this time, the coil 4 forms a magnetic field around the superconductor 5. Once this magnetic field has been made a magnetic field equal to or higher than the critical magnetic field in which the intrusion of a magnetic flux into the superconductor 5 starts, the superconductor 5 is magnetized. Consequently, even after the current for generating a magnetic field equal to or higher than the critical magnetic field in which the intrusion of a magnetic flux into the superconductor 5 starts, has become nonexistent, the superconductor 5 keeps the magnetized state and functions as a magnet for the equipment 1 using the superconductor 5 as a magnet. Here, the vacuum container 2 performs a heat insulating function.

Such a magnetizing device for superconductor is disclosed in [Patent Document 1] described later.

Figure 2:
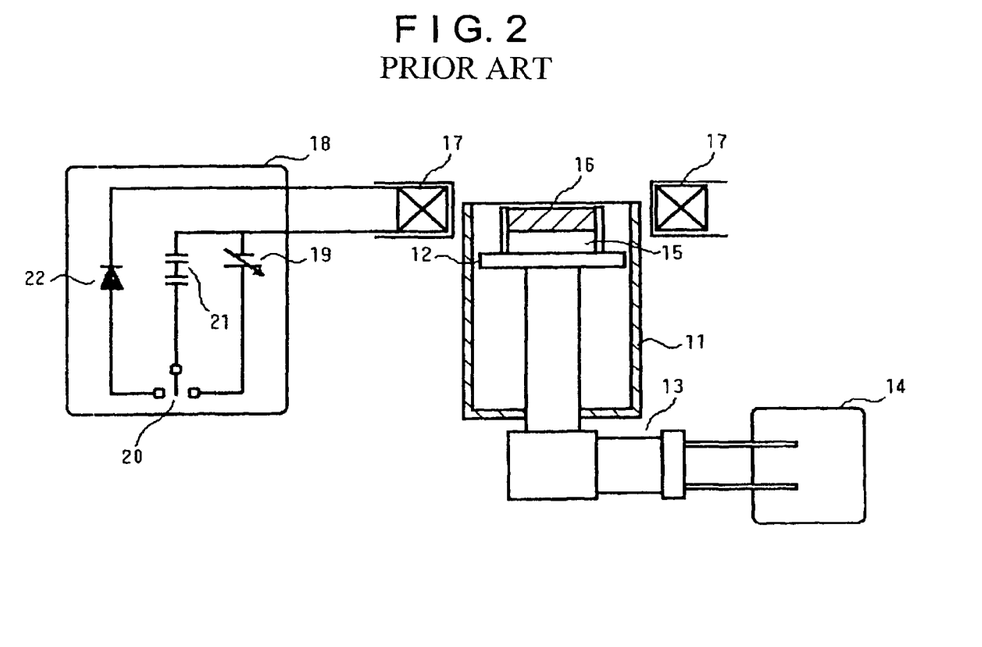
FIG. 2 is a constructional view of a conventional magnetizing device (example 2) for superconductor.

FIG. 2 is a constructional view of a conventional magnetizing device (example 2) for superconductor.

In FIG. 2, reference numeral 11 denotes a heat-insulating container; numeral 12 denotes a cold head provided in the heat-insulating container 11; numeral 13 denotes a refrigerator for cooling the cold head 12; numeral 14 denotes a compressor for the refrigerator 13; numeral 15 denotes a copper block provided in the heat-insulating container 11 in contact with the cold head 12; numeral 16 denotes a superconductor arranged in the heat-insulating container 11 in contact with the copper block 15; numeral 17 denotes magnetizing coils installed outside the heat-insulating container 11 and generating magnetic fluxes around the superconductor 16; and numeral 18 denotes a pulse power source for feeding a pulse current that is controlled to cause the magnetizing coils 17 to generate magnetic fluxes, taking into account magnetic fluxes trapped by the superconductor 16. The pulse power source 18 is constituted of a direct-current variable voltage source 19, a changeover switch 20, a capacitor 21, and a diode 22.

The superconductor 16 arranged in the heat-insulating container 11 is cooled down to or below a superconducting transition temperature together with the copper block 15 by thermal conduction, using the cold head 12 cooled down by the refrigerator 13. Upon receipt of the supply of different pulse currents from the pulse power source 18, the magnetizing coils 17 generate, around the superconductor 16, respective magnetic fluxes in proportion to the magnitudes of the different pulse currents. The magnetic fluxes are trapped by the superconductor 16 cooled down to or below a superconducting transition temperature. The amount of magnetic fluxes depends on how to feed pulse currents to the magnetizing coils 17. The pulse power source 18 firstly interconnects the direct-current variable voltage source 19 and the capacitor 21 by the changeover switch 20 and charges the capacitor 21. Then, the pulse power source 18 changes over the changeover switch 20, and interconnects the capacitor 21 and the magnetizing coils 17 to thereby feed a pulse current to the magnetizing coils 17. The repetition of this procedure allows the pulse power source 18 to feed a plurality of pulse currents to each of the magnetizing coils 17. Also, when interconnecting the direct-current variable voltage source 19 and the capacitor 21 to thereby charge the capacitor 21, changing the voltage of the direct-current variable voltage source 19 allows the charge voltage of the capacitor 21 to change, thereby enabling the amplitude of pulse current to change. The diode 22 operates so as to prevent the capacitor 21 from being subjected to a voltage in the direction opposite to the direction of the charging voltage.

Such a magnetizing device for superconductor is disclosed in the following [Patent Document 2] to [Patent Document 4].

[Patent Document 1]
Japanese Patent No. 3172611, pp. 2 to 4, and FIG. 1.
[Patent Document 2]
Japanese Unexamined Patent Application Publication No. 10-12429, pp. 5 to 6, and FIG. 1.
[Patent Document 3]
Japanese Unexamined Patent Application Publication No. 10-154620, pp. 3 to 4, and FIG. 1.
[Patent Document 4]
Japanese Unexamined Patent Application Publication No. 2001-110637, p. 5, and FIG. 1.

DISCLOSURE OF INVENTION

To such one that, in a state where a superconductor has been cooled down to or below a critical temperature at which the transition to a superconducting state occurs, generates, around the superconductor, a magnetic field equal to or higher than a critical magnetic field in which the intrusion of a magnetic flux into the superconductor starts, to thereby magnetize the superconductor, the positional relationship and the magnitude relationship between the superconductor and coils are important depending on the equipment using the superconductor as a magnet. For example, when attempting to use the superconductor as a field magnet for a synchronous machine, armature coils are indispensable in the vicinity thereof. Also, when attempting to use the armature coils in combination with coils as an element constituting means for generating a magnetic field equal to or higher than a critical magnetic field in which the intrusion of a magnetic flux into the superconductor starts, it is necessary to allow the superconductor to be placed outside the armature coils, and to enable the relative positional relationship between the superconductor and the armature coils to be modified.

In the conventional magnetizing device for superconductor as shown in FIG. 1, the superconductor 5 and the hollow portion of the coil 4 to generate a magnetic field therearound are related to each other so that the hollow portion of the coil 4 is larger than the superconductor 5, and so that the superconductor 5 enters the hollow portion of the coil 4.

Also in the differently configured magnetizing device for superconductor as shown in FIG. 2, a superconductor 16 is arranged in magnetizing coils 17, as well, and in addition it has a large-scale construction.

In the light of the above-described situations, the object of the present invention is to provide a magnetizing device for superconductor and a superconducting synchronous machine capable of constituting more compact and simple equipment that uses a superconductor as a magnet.

In order to achieve the above-described object, the present invention provides:

[1] a magnetizing device for superconductor, the magnetizing device being characterized by including a superconductor; cooling means for cooling the superconductor down to or below a critical temperature at which the transition to a superconducting state occurs; magnetic field generating means that generates a magnetic field equal to or higher than a critical magnetic field in which the intrusion of a magnetic flux into the superconductor starts, around the superconductor cooled down to or below the critical temperature at which the transition to the superconducting state occurs; and position modification means capable of arranging the superconductor outside a coil as an element constituting the magnetic field generating means, and modifying the relative positional relationship between the superconductor and the coil;

[2] the magnetizing device for superconductor as recited in the above [1], wherein the position modification means is disposed on the fixed sides as the magnetic field generating means, and wherein the superconductor can be disposed by the position modification means so as to be sandwiched between a pair of opposing coils;

[3] the magnetizing device for superconductor as recited in the above [2], wherein the superconductor is a high temperature superconductor arranged on a rotating plate.

[4] the magnetizing device for superconductor as recited in the above [2], wherein each of the pair of coils is formed as a spiral shape coil opposed to a surface of the superconductor;

[5] a superconducting synchronous machine characterized by including a superconductor arranged on a disk; cooling means for cooling the superconductor down to or below a critical temperature at which the transition to a superconducting state occurs; magnetic field generating means that generates a magnetic field equal to or higher than a critical magnetic field in which the intrusion of a magnetic flux into the superconductor starts, around the superconductor cooled down to or below the critical temperature at which the transition to the superconducting state occurs; an alternating current power source for supplying the magnetic field generating means with a current for driving the superconductor; and a mode changeover switch for performing a changeover between a magnetic field generation mode and an alternating current supply mode;

[6] a superconducting synchronous machine characterized by including a superconductor arranged on a disk; cooling means for cooling the superconductor down to or below a critical temperature at which the transition to a superconducting state occurs; magnetic field generating means that generates a magnetic field equal to or higher than a critical magnetic field in which the intrusion of a magnetic flux into the superconductor starts, around the superconductor cooled down to or below the critical temperature at which the transition to the superconducting state occurs; a prime mover for rotationally driving the disk with the superconductor provided thereon; and a mode changeover switch for performing a changeover between a magnetic field generation mode and a power generation mode;

[7] a superconducting synchronous machine characterized by including a superconductor arranged on a disk; cooling means for cooling the superconductor down to or below a critical temperature at which the transition to a superconducting state occurs; magnetic field generating means that generates a magnetic field equal to or higher than a critical magnetic field in which the intrusion of a magnetic flux into the superconductor starts, around the superconductor cooled down to or below the critical temperature at which the transition to the superconducting state occurs; an alternating current power source for supplying the magnetic field generating means with a current for driving the superconductor; a prime mover for rotationally driving the disk with the superconductor provided thereon; and a mode changeover switch for performing a changeover among a magnetic field generation mode, an alternating current supply mode, and a power generation mode;

[8] the superconducting synchronous machine as recited in the above [5], [6], or [7], further including a sensor for detecting the strength of a magnetic field of the superconductor to control the magnetization of the superconductor;

[9] the superconducting synchronous machine as recited in the above [5], [6], or [7], wherein the magnetic field generating means is disposed on the fixed sides; and wherein the superconductor can be disposed so as to be sandwiched between a pair of opposing armature coils;

[10] the superconducting synchronous machine as recited in the above [9], wherein each of the pair of coils is formed as a spiral shape coil opposed to a surface of the superconductor;

[11] the superconducting synchronous machine as recited in the above [9], wherein the number of the pairs of armature coils is an integral multiple of three; and wherein the number of the superconductors is an integral multiple of two;

[12] the superconducting synchronous machine as recited in the above [5], [6], or [7], wherein the superconductor is a high temperature superconductor; and

[13] the superconducting synchronous machine as recited in the above [5], [6], or [7], wherein the disk is cooled down by the cooling means.

BEST MODE FOR CARRYING OUT THE INVENTION

Hereinafter, embodiments according to the present invention will be described in detail.

Figure 3:
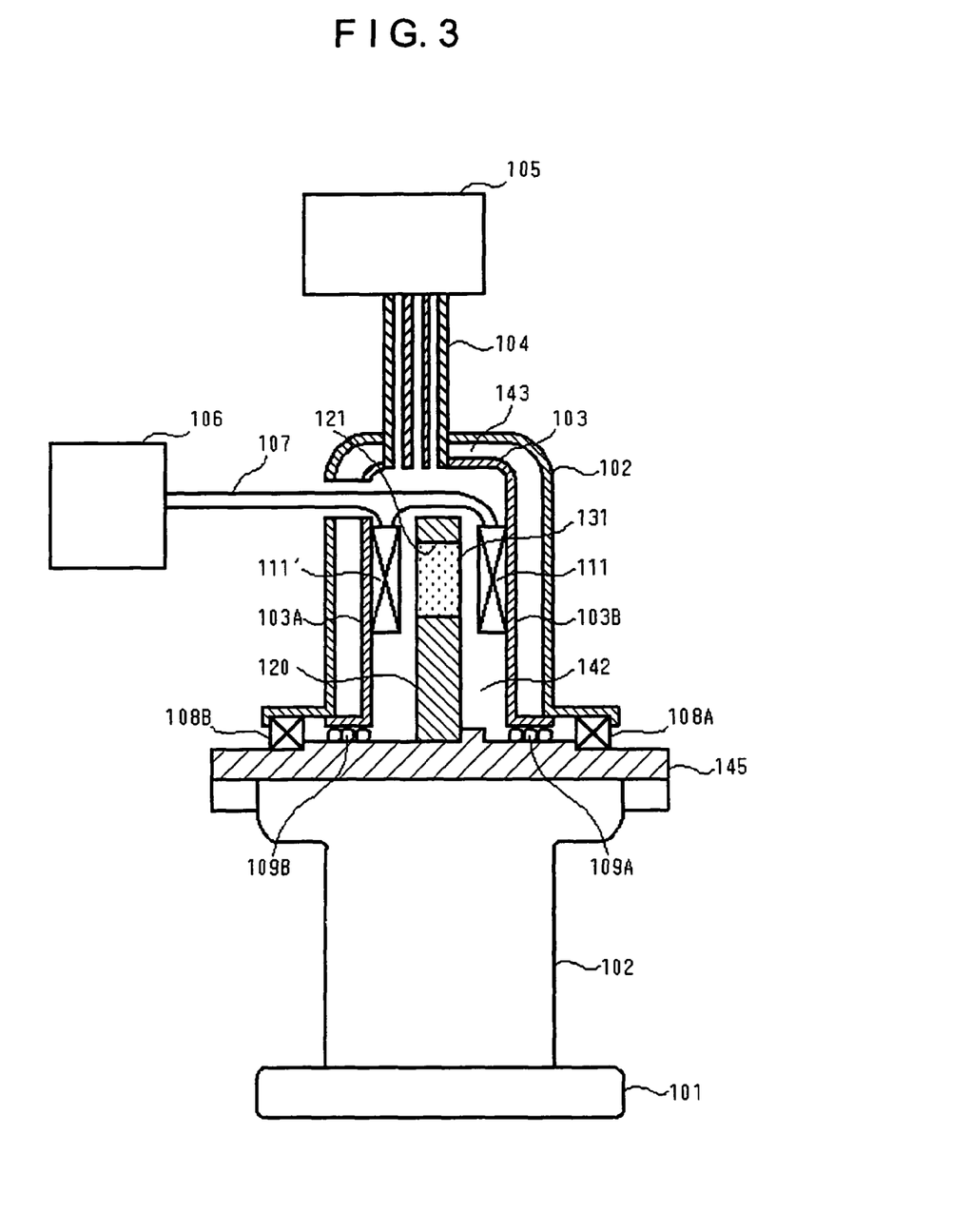
FIG. 3 is a constructional view of a magnetizing device for superconductor, according to a first embodiment of the present invention.
Figure 4:
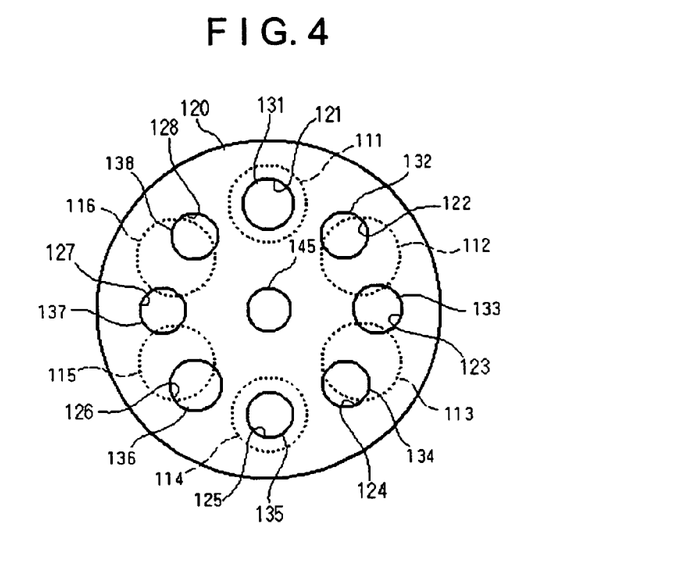
FIG. 4 is a plan view of the superconductor portion in the first embodiment of the present invention.

FIG. 3 is a constructional view of a magnetizing device for superconductor according to a first embodiment of the present invention, and FIG. 4 is a plan view of the superconductor portion thereof.

In FIGS. 3 and 4, reference numeral 101 denotes a base; numeral 102 denotes an outer casing, numeral 103 denotes an inner casing; numeral 104 denotes a pipe, numeral 105 denotes a coolant generating unit; numeral 106 denotes a magnetization power source for supplying a pulse current to coils serving as magnetic field generating means; numeral 107 denotes a connection line; numerals 108A and 108B denote bearings, numerals 109A and 109B denote seals; numerals 111 and 111'-116 and 116' denote coils; numeral 142 denotes a coolant chamber (cooling means) having a coolant generated by the coolant generating unit 105; numeral 143 denotes a heat insulating portion (heat insulating means); numeral 145 denotes a shaft; numeral 120 denotes a disk; numerals 121 to 128 denote holes formed in the disk 120; and numerals 131 to 138 denote superconductors (here, high temperature superconductors) to be arranged in the holes 121 to 128, respectively.

Hereinafter, operations of this magnetizing device for superconductor will be described.

First, eight superconductors 131 to 138 mounted to the disk 120 are cooled down to or below a critical temperature at which the transition to a superconducting state occurs, with a coolant in the coolant chamber 142, such as liquid nitrogen. Next, the disk 120 is rotated about the shaft 145 relative to the coils 111 and 111'-116 and 116' serving as an element of magnetic field generating means and mounted to the side portions 103A and 103B of the inner casing 103 by six so as to mutually opposed, and, e.g., the coils 111 and 111' and the superconductor 131 are center-aligned with one another (at this time, as shown in FIG. 4, the opposing coils 114 and 114' and the superconductor 135 also center-align with one another). In this state, once a current has been fed from the magnetization power source 106 to the coils 111 and 111' (it is also possible to simultaneously feed a current to the coils 114 and 114'), to thereby generate, around the superconductor 131, a magnetic field equal to or higher than the critical magnetic field in which the intrusion of a magnetic flux into the superconductor 131 starts, the superconductor 131 is magnetized. Even after the current having been fed from the magnetization power source 106 to the coils 111 and 111' becomes nonexistent, the magnetization remains in the superconductor 131, and the superconductor 131 becomes a magnet (the superconductor 135 can also be simultaneously magnetized). Next, the disk 120 is rotated to thereby center-align, e.g., the coils 111', the superconductor 132, and the coil 111 with one another, and magnetization is performed following the same procedure. At this time, however, a current in the direction opposite to that of the above-described current is fed. Thereupon, the superconductor 132 becomes a magnet (the superconductor 136 can also be simultaneously magnetized). In this manner, the superconductors 131, 133, 135, and 137 can be each made a magnet having an equal polarity, while the superconductors 132, 134, 136, and 138 can be each made a magnet having the polarity opposite to the above-described polarity.

As described above, with respect to the coils serving as an element of magnetic field generating means and generating a magnetic field equal to or higher than the critical magnetic field in which the intrusion of a magnetic flux into the superconductor starts, around the superconductor cooled down to or below the critical temperature at which the transition to a superconducting state occurs, the disk having superconductors mounted thereon is arranged so as to rotate. This makes it possible to easily magnetize the superconductor.

Figure 5:
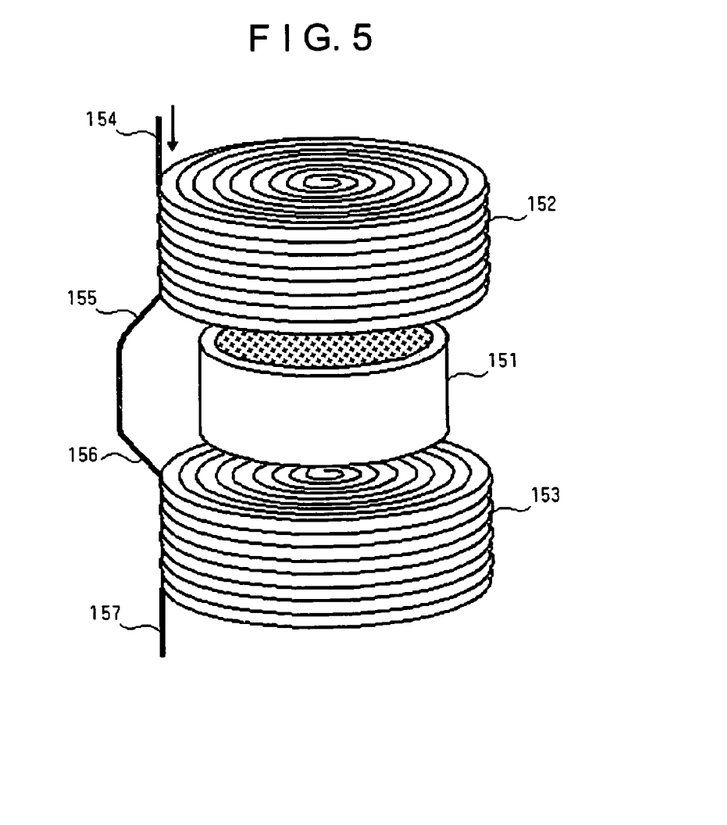
FIG. 5 is a schematic view showing a layout of opposing coils and the superconductor (high temperature superconductor) according to the embodiment of the present invention.

FIG. 5 is a schematic view showing a layout of opposing coils and a superconductor (high temperature superconductor) according to the embodiment of the present invention.

In FIG. 5, reference numeral 151 denotes a high temperature superconducting bulk body serving as a superconductor, and numerals 152 and 153 denote coils fixedly opposed so as to sandwich the high temperature superconducting bulk body 151 therebetween. These coils 152 and 153 are each formed by spirally winding copper lines in a multilayer manner, and are connected in series with each other. The coils 152 and 153 can generate a magnetic field equal to or higher than the critical magnetic field in which the intrusion of a magnetic flux into the high temperature superconducting bulk body 151 starts, around the high temperature superconducting bulk body 151 cooled down to or below the critical temperature at which the transition to a superconducting state occurs, to thereby magnetize the high temperature superconducting bulk body 151. In FIG. 5, reference numerals 154 to 157 denote lead wires for coils 152 and 153.

Figure 6:
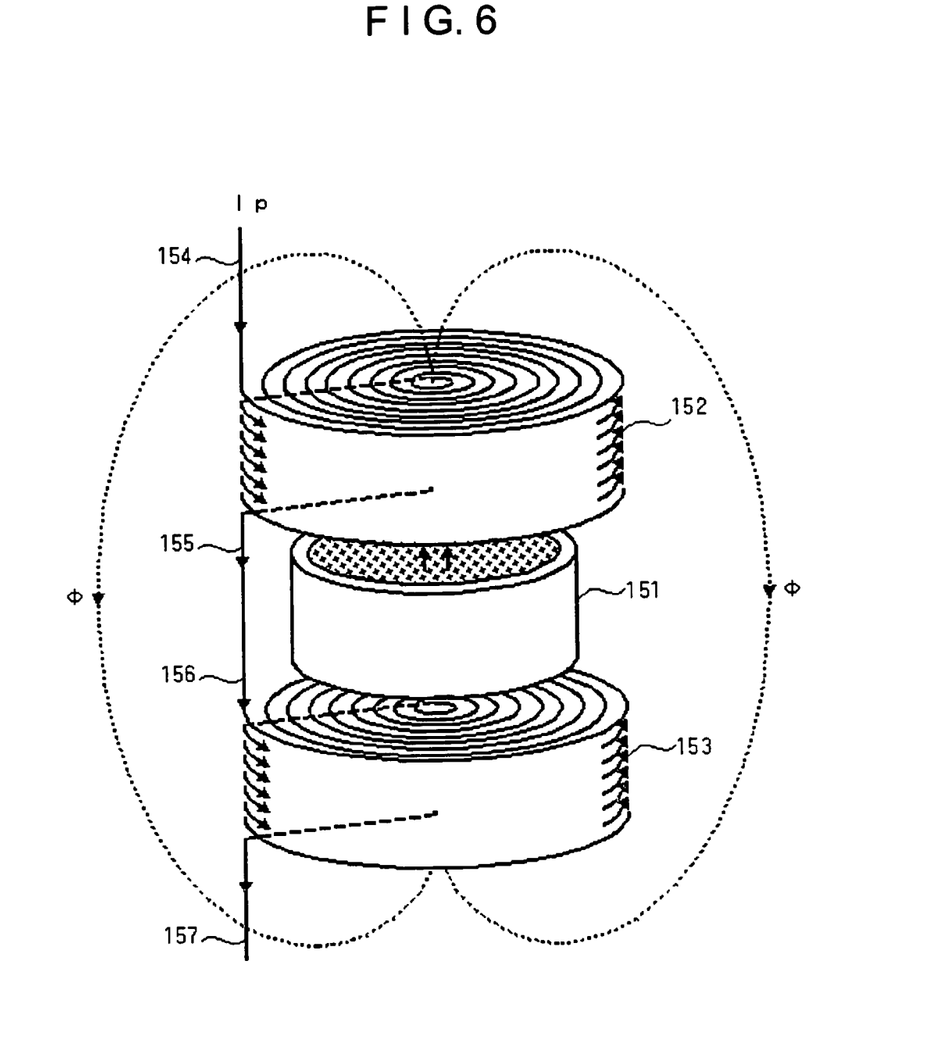
FIG. 6 is a constructional view of the opposing coils in the embodiment of the present invention.

FIG. 6 is a constructional view of opposing coils in the embodiment of the present invention.

As shown in FIG. 6, the coils 152 and 153 are each formed by spirally winding copper lines in a multilayer manner (e.g., eight layer configuration), and they are connected in series with each other. Hence, as shown in FIG. 6, feeding of a pulse current Ip to the coils 152 and 153 generates a magnetic flux Φ, and allows a magnetic field equal to or higher than the critical magnetic field in which the intrusion of a magnetic flux into the high temperature superconducting bulk body 151 starts, to be generated around the high temperature superconducting bulk body 151 cooled down to or below the critical temperature at which the transition to a superconducting state occurs, thereby enabling the high temperature superconducting bulk body 151 to be magnetized.

As the high temperature superconducting bulk body 151, it is desirable to use an RE—Ba—Cu—O superconductor (RE: a rare-earth element such as Gd, Sm, or Y) out of high temperature superconductors, the RE-Ba—Cu—O superconductor exhibiting a high critical current density without being suffered from the destruction of its superconductivity, even in a high magnetic field in the vicinity of 77 kelvins (absolute temperature), i.e., −196° C., which is easily attained with liquid nitrogen.

Such an RE-Ba—Cu—O bulk superconductor is a lump (bulk) of a high temperature superconductor obtained by dispersing a non-superconducting phase exhibiting the pinning effect into a raw material and melting it to grow, and it can trap a higher magnetic field (i.e., can be magnetized so as to have a higher magnetic field) than a high-performance permanent magnet. However, in order to utilize this bulk superconducting magnet, it is necessary to magnetize the superconducting bulk body by any method.

Figure 7:
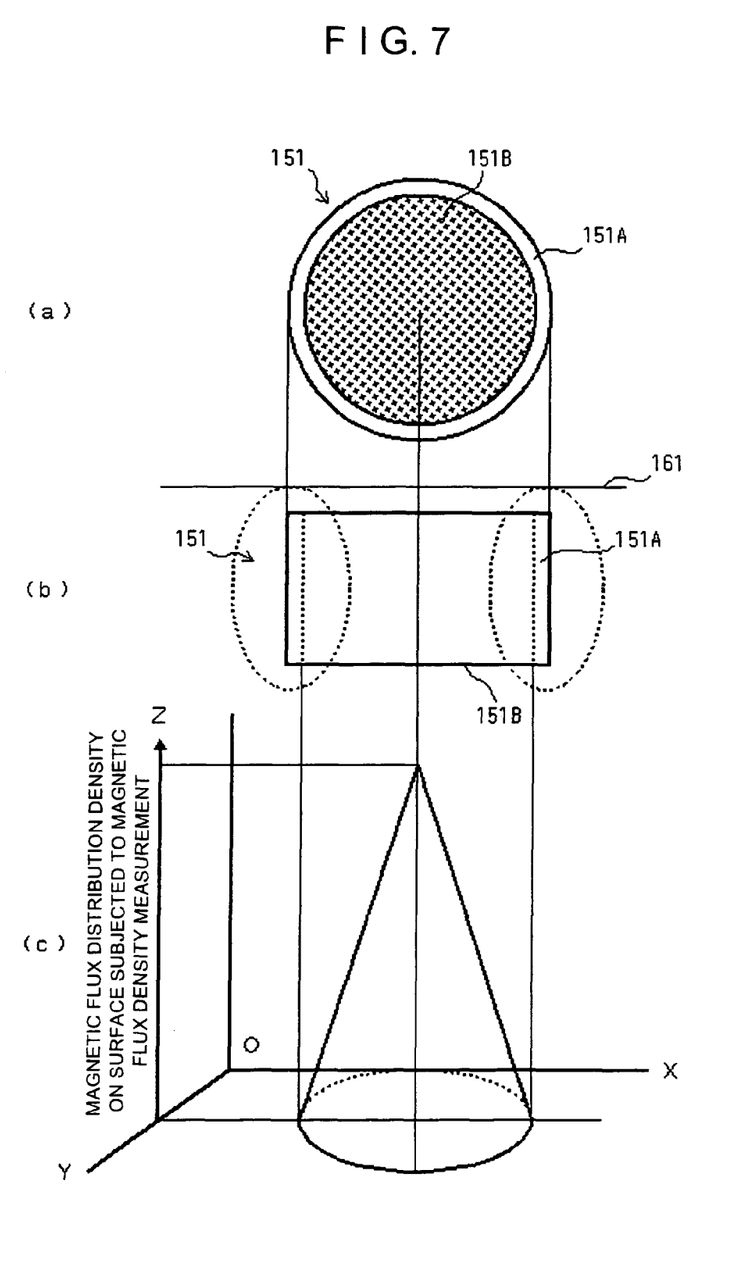
FIG. 7 is a diagram showing the state of a cone-shaped magnetic field distribution generated by the coils according to the present invention.

In the present invention, focusing attention on the fact that the magnetic field distribution of a magnetized high temperature superconducting bulk body becomes a cone-shaped distribution having a highest magnetic field at the center thereof, a cone-shaped magnetic field distribution is generated by passing a pulse current through the above-described coils formed by spirally winding copper line, and at 77 kelvins, as shown in FIG. 7, an oxide superconducting bulk material 151B (feed composition: $Gd_1 Ba_2 Cu_3 O_{6.9}$, 70.9 wt %, $Gd_2 Ba_1 Cu_1 O_{5.0}$, 19.2 wt %, Pt 0.5 wt %, Ag 9.4 wt %) having a stainless side band 151A for inhibiting self-destruction on the side surface thereof, is used as the high temperature superconducting bulk body 151.

Such a Gd-based bulk high temperature superconductor is efficiently magnetized so as to have a high magnetic field with a strength over 1 Tesla.

FIG. 7 is a diagram showing the state of a cone-shaped magnetic field distribution generated by the coils according to the present invention.

As shown in FIG. 6, when a pulse current Ip is passed through spiral coils 152 and 153 that are arranged so that the spiral copper lines are connected in series, a cone-shaped magnetic field distribution, as shown in FIG. 7C, can be generated on the surface 161 in FIG. 7B that is subjected to magnetic flux density measurement.

This method has made it possible to easily and efficiently perform magnetization providing a magnetic field strength over 1 Tesla by using liquid nitrogen, the magnetization providing a magnetic field strength over 1 Tesla having conventionally been performed by using a helium refrigerator or a superconducting magnet.

Figure 9:
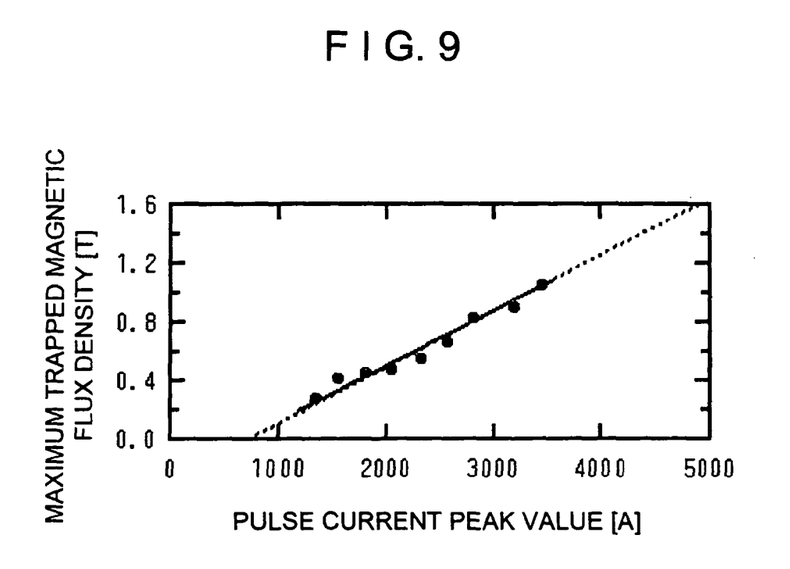
FIG. 9 is a graph showing the relationship between the pulse current peak value and the maximum trapped magnetic flux density in the embodiment of the present invention.

As shown in FIG. 9, in experiments of the present invention, the relationship in which the maximum magnetic field by magnetization increases in proportion to the magnitude of applied pulse current, has been obtained.

In relation with this respect, detailed explanations are given below. As shown in the conventional example, the magnetizing methods for bulk superconducting magnet include the magnetostatic field magnetizing method (see FIG. 1) using an magnetostatic field of a superconducting magnet separately prepared, and the pulse magnetizing method (see FIG. 2) in which a pulse current is passed through coils placed around a bulk body to thereby magnetize it by the resulted pulse magnetic field. According to the magnetostatic field magnetizing method, a high magnetic field with a strength over 4 Tesla is obtained by magnetization at 77 kelvins. However, because the magnetizing apparatus itself is large in size, it is difficult to perform magnetization after a high temperature superconductor has been incorporated into equipment. On the other hand, the pulse magnetizing method has high practical utility because it allows magnetization after magnetizing coils has been incorporated into equipment together with a high temperature superconducting bulk body. However, the conventional method does not allow the magnetizing strength higher than 1 Tesla to be obtained at 77 kelvins. This necessitates to cool down the bulk body below 77 kelvins by a helium refrigerator, in order to offset the differentiation of the generated magnetic field from that by an alloy-based permanent magnet.

Figure 8:
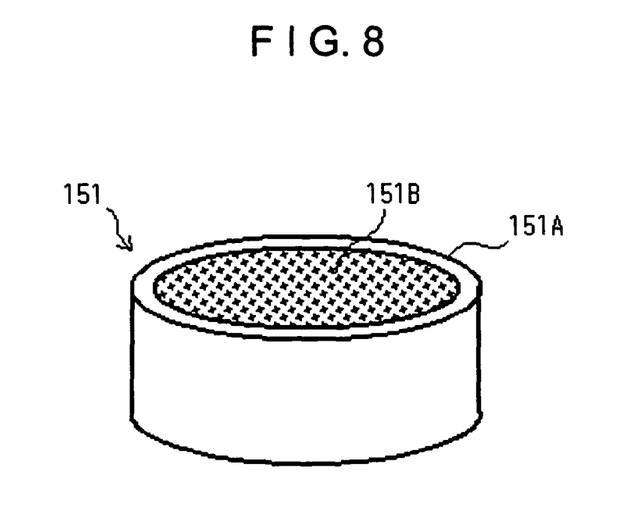
FIG. 8 is a perspective view of the superconductor (high temperature superconductor) according to the embodiment of the present invention.

On the other hand, according to the present invention, focusing attention on the fact that the magnetic field distribution of a magnetized high temperature superconducting bulk body becomes a cone-shaped distribution having a highest magnetic field at the center thereof, a cone-shaped magnetic field distribution is generated by passing a pulse current through the coils formed by spirally winding copper line, and at 77 kelvins, a Gd-based bulk high temperature superconductor (see FIG. 8) could be efficiently magnetized so as to have a high magnetic field with a strength over 1 Tesla. By this magnetizing method, it has made possible to easily and efficiently perform magnetization providing a magnetic field strength over 1 Tesla by using liquid nitrogen, the magnetization providing a magnetic field strength over 1 Tesla having conventionally been performed by using a helium refrigerator or a superconducting magnet.

Figure 10:
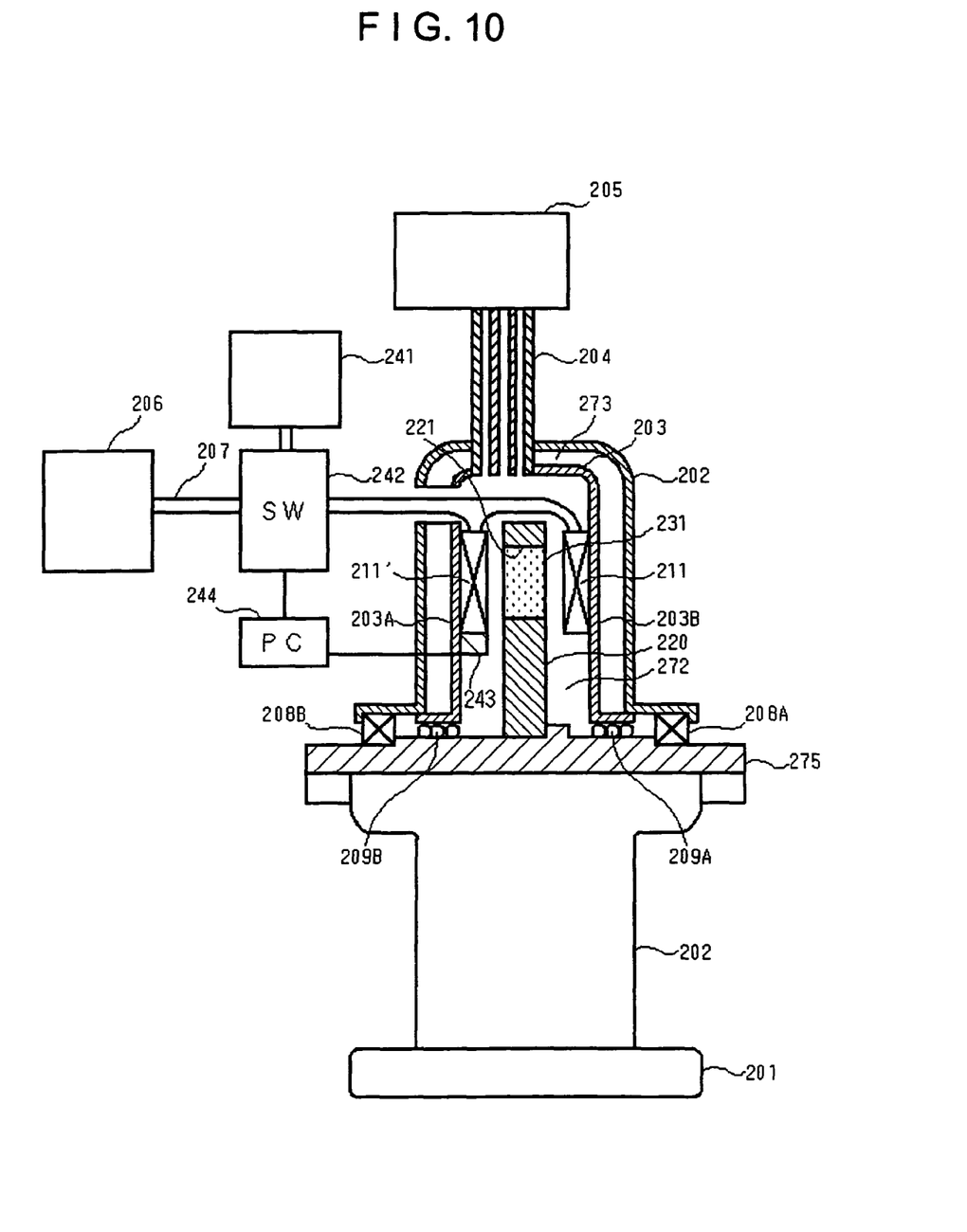
FIG. 10 is a constructional view of an induction motor type synchronous machine having a magnetizing device for superconductor, according to a second embodiment of the present invention.
Figure 11:
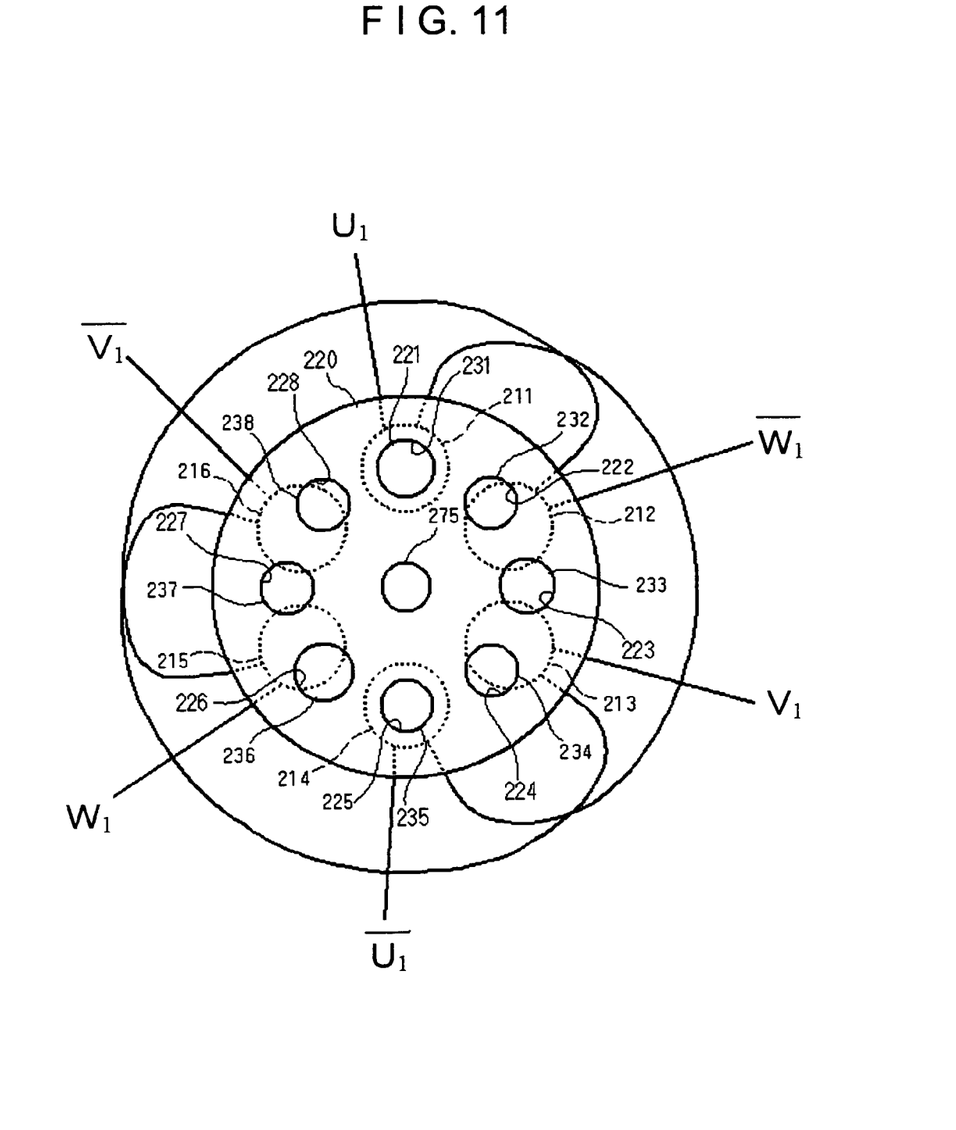
FIG. 11 is a plan view of the superconductor portion of the induction motor type synchronous machine having the magnetizing device for superconductor, according to the second embodiment of the present invention.

FIG. 10 is a constructional view of an induction motor type synchronous machine having a magnetizing device for superconductor, according to a second embodiment of the present invention, and FIG. 11 is a plan view of the superconductor portion thereof.

In FIGS. 10 and 11, reference numeral 201 denotes a base; 202 denotes an outer casing; numeral 203 denotes inner casing; numeral 204 denotes a pipe, numeral 205 denotes a coolant generating unit serving as cooling means; numeral 206 denotes a magnetization power source for supplying a pulse current to coils serving as magnetic field generating means; numeral 207 denotes a connection line; numerals 208A and 208B denote bearings, numerals 209A and 209B denote seals; numerals 211 and 211'-216 and 216' denote armature coils; numeral 272 denotes a coolant chamber (cooling means) having a coolant generated by the coolant generating unit 205; numeral 273 denotes a heat insulating portion (heat insulating means); numeral 275 denotes a shaft; numeral 220 denotes a disk; numerals 221 to 228 denote holes formed in the disk 220; and numerals 231 to 238 denote superconductors (here, high temperature superconductors) arranged in the holes 221 to 228, respectively; numeral 241 denotes an alternating current power source for supplying an alternating current to the armature coils 211 and 211'-216 and 216' and driving the synchronous machine; numeral 242 denotes a mode changeover switch for performing a changeover between a magnetic field generation mode (magnetization mode) and an alternating current supply mode (electromotive mode) by performing a changeover between the magnetization power source 206 and the alternating current power source 241. Here, a magnetic field sensor (here, a Hall element) 243 is provided inside the inner casing 203 whereby, if the magnetic force of the superconductor detected by this magnetic field sensor 243 falls short of a predetermined value, the mode changeover switch 242 is automatically changed over to the magnetization mode via a controller (PC) 244.

Meanwhile, the disk 220 may be cooled one. In that case, extra cooling means is to be added although it is not shown.

Hereinafter, operations of the induction motor type synchronous machine having a magnetizing device for superconductor will be described.

First, descriptions are made of the magnetization mode.

Eight superconductors 231 to 238 mounted to the disk 220 are cooled down to or below a critical temperature at which the transition to a superconducting state occurs, with a coolant in the coolant chamber 272, such as liquid nitrogen. The disk 220 is rotated about the shaft 275 relative to the armature coils 211 and 211'-216 and 216' serving as an element of magnetic field generating means and mounted to the side portions 203A and 203B of the inner casing 203 by six so as to mutually opposed, and, e.g., the armature coils 211 and 211' and the superconductor 231 are center-aligned with one another (at this time, as shown in FIG. 11, the opposing armature coils 214 and 214' and the superconductor 235 also center-align with one another). In this state, once a current has been fed from the magnetization power source 206 to the armature coils 211 and 211' (it is also possible to simultaneously feed a current to the armature coils 214 and 214'), to thereby generate, around the superconductor 231, a magnetic field equal to or higher than the critical magnetic field in which the intrusion of a magnetic flux into the superconductor 231 starts, the superconductor 231 is magnetized. Even after the current having been fed from the magnetization power source 206 to the armature coils 211 and 211' becomes nonexistent, the magnetization remains in the superconductor 231, and the superconductor 231 becomes a magnet (the superconductor 235 can also be simultaneously magnetized). Next, the disk 220 is rotated to thereby center-align, e.g., the armature coil 211', the superconductor 232, and the armature coil 211 with one another, and magnetization is performed following the same procedure. At this time, however, a current in the direction opposite to that of the above-described current is fed. Thereupon, the superconductor 232 becomes a magnet (the superconductor 236 can also be simultaneously magnetized). In this manner, the superconductors 231, 233, 235, and 237 are each made a magnet having an equal polarity, while the superconductors 232, 234, 236, and 238 are each made a magnet having the polarity opposite to the above-described polarity. The disk 220, to which superconductors 231 to 238 are mounted, and the inner casing 203, to which the armature coils 211' to 216' and the armature coils 211 to 216 are mounted with the superconductors 231 to 238 therebetween, correspond to the field magnet and the armature coils of the synchronous machine, respectively. As a result, the armature coils 211' to 216' and the armature coils 211 to 216 can share the coil's function of magnetizing the superconductors.

FIG. 11 shows an example of three-phase connections of armature coils. Specifically, a $U_1$ phase is connected to the armature coil 211; a $-U_1$ phase is connected to the armature coil 214; a $V_1$ phase is connected to the armature coil 213; a $-V_1$ phase is connected to the armature coil 216; a $W_1$ phase is connected to the armature coil 215; and a $-W_1$ phase is connected to the armature coil 212.

Once the superconductors 231 to 238 have been magnetized, the present superconducting synchronous machine is brought into the alternating current supply mode (electromotive mode) by changing over the mode changeover switch 242 from the magnetizing power source 206 to the alternating current power source 241, so that it functions as a superconducting synchronous motor in accordance with Fleming's left-hand rule between the magnetized superconductors 231 to 238 and the armature coils 211 and 211'-216 and 216'. In a driven state of this synchronous machine, as described above, the strength of magnetic force of the superconductor thereof is monitored by the magnetic field sensor 243 and the controller 244, and if the strength of magnetic force falls short of a predetermined value, a mode changeover to the magnetization mode for the superconductor can automatically be performed.

As described above, with respect to the armature coils serving as an element of magnetic generating means and generating a magnetic field equal to or higher than a critical magnetic field in which the intrusion of a magnetic flux into the superconductor starts, around the superconductor cooled down to or below the critical temperature at which the transition to a superconducting state occurs, the disk with superconductors mounted thereon has been enabled to rotate, and the superconductor and the armature coils have been allowed to function as the field magnet and the armature coils of the synchronous machine, respectively. This makes it possible to downsize the induction motor type superconducting synchronous machine.

Figure 12:
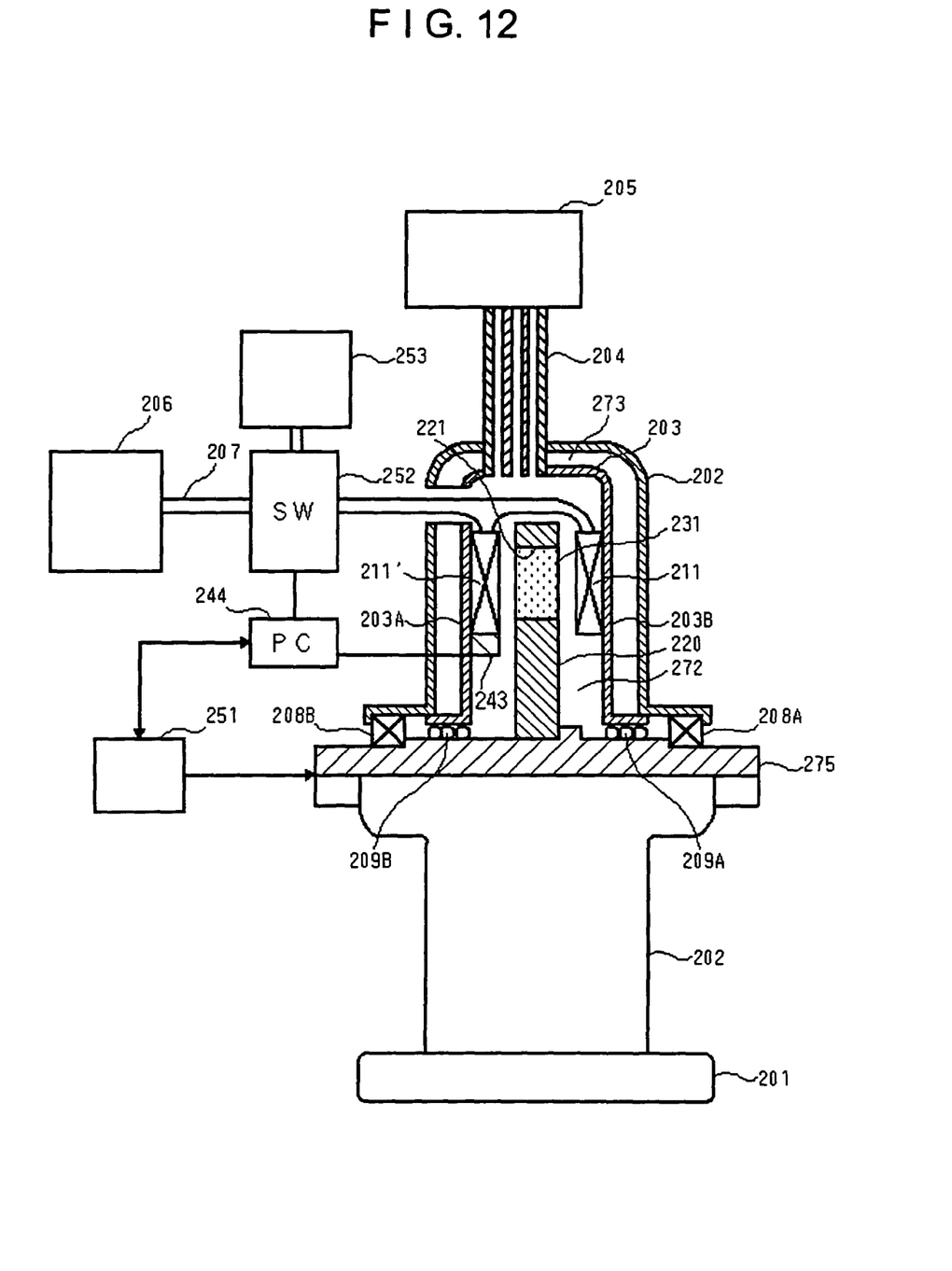
FIG. 12 is a constructional view of a generator type synchronous machine having a magnetizing device for superconductor, according to a third embodiment of the present invention.

FIG. 12 is a constructional view of a generator type synchronous machine having a magnetizing device for superconductor, according to a third embodiment of the present invention.

The difference of this embodiment from the above-described second embodiment will be described below. During the power generation mode, which has been brought about by the mode changeover switch 252 for performing the changeover between the magnetic field generation mode (magnetization mode) and the power generation mode, the present superconducting synchronous machine is adapted to rotationally drive the shaft 275 by the prime mover 251, and thereby to generate power by an electromagnetic induction action occurring between the magnetized superconductors 231 to 238 and the armature coils 211 and 211'-216 and 216' in accordance with Fleming's right-hand rule so as to supply power to a load 253. In the magnetization mode to be used, e.g., when the reduction in magnetic forces of the superconductors 231 to 238 is detected by the magnetic field sensor 243 and the controller 244, the present superconducting synchronous machine can be adapted to magnetize the superconductors 231 to 238 by the same method as that in the first and second embodiments.

As described above, with respect to the armature coils serving as an element of magnetic field generating means and generating a magnetic field equal to or higher than a critical magnetic field in which the intrusion of a magnetic flux into the superconductor starts, around the superconductor cooled down to or below the critical temperature at which the transition to a superconducting state occurs, the disk with superconductors mounted thereon has been enabled to rotate, and the superconductor and the armature coils have been allowed to function as the field magnet and the armature coils of the synchronous machine, respectively. This makes it possible to downsize the inductive power generator type superconducting synchronous machine.

Figure 13:
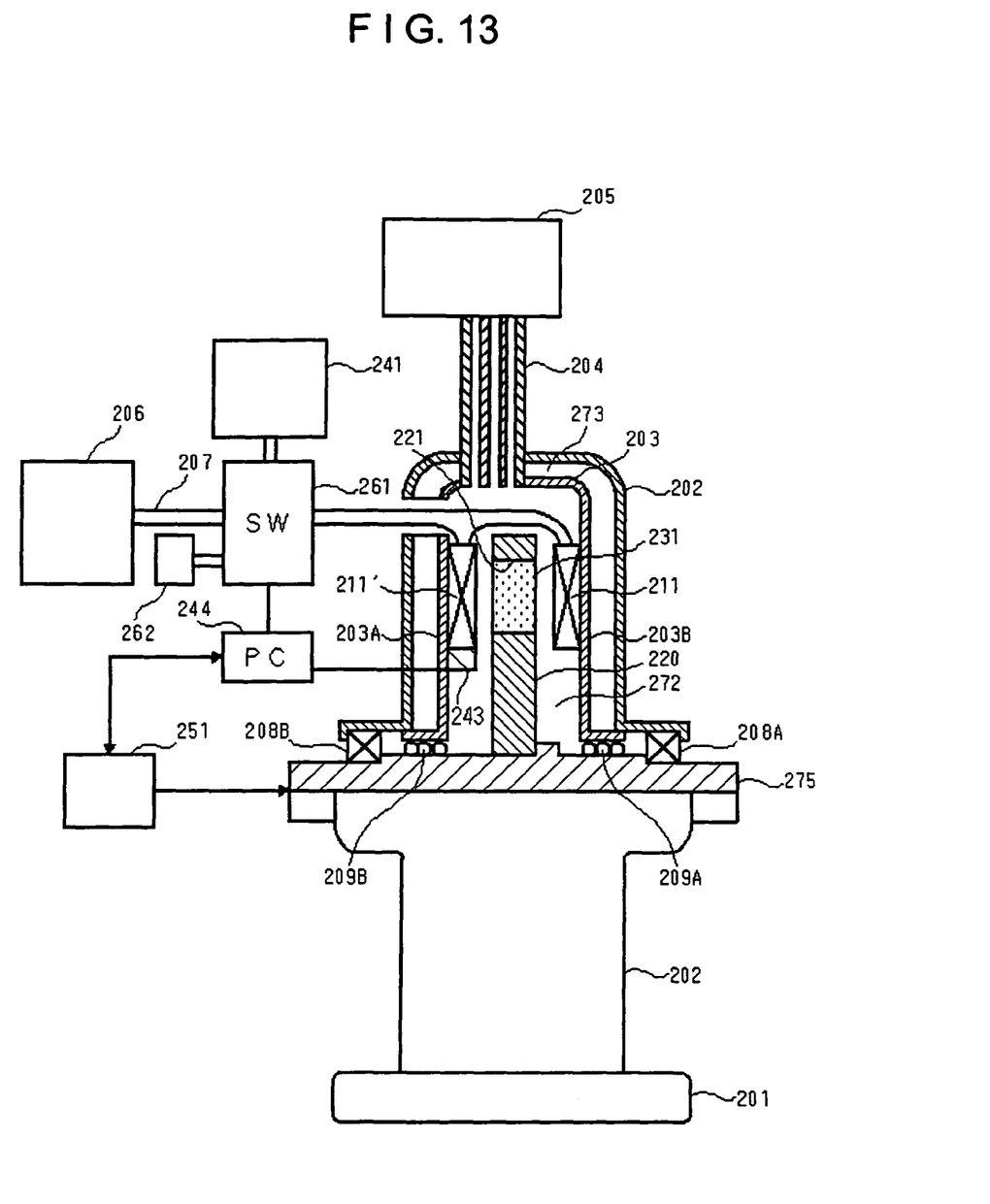
FIG. 13 is a constructional view of a generator type synchronous machine having a magnetizing device for superconductor, according to a fourth embodiment of the present invention.

FIG. 13 is a constructional view of a generator type synchronous machine having a magnetizing device for superconductor, according to a fourth embodiment of the present invention.

In this embodiment, (1) when the present superconducting synchronous machine has been brought into the alternating current supply mode (electromotive mode) by changing over the mode changeover switch 261 for performing the changeover among the magnetic field generation mode (magnetization mode), the alternating current supply mode (electromotive mode), and the power generation mode, it functions as a superconducting synchronous motor by being subjected to the supply of alternating currents from the alternating current source 241 to the armature coils 211 and 211'-216 and 216', as in the illustrated second embodiment;

(2) when the present superconducting synchronous machine has been brought into the power generation mode by changing over the mode changeover switch 261 for performing the changeover among the magnetic field generation mode (magnetization mode), the alternating current supply mode (electromotive mode), and the power generation mode, it is adapted to rotationally drive the shaft 275 by the prime mover 251, and thereby to generate power by an electromagnetic induction action occurring between the magnetized superconductors 231 to 238 and the armature coils 211 and 211'-216 and 216' in accordance with Fleming's right-hand rule so as to supply power to a load 262, as in the case of the third embodiment;

(3) no matter whether being in the power generation mode or electromotive mode, in the magnetization mode to be used, e.g., when the reduction in magnetic forces of the superconductors 231 to 238 is detected by the magnetic field sensor 243 and the controller 244, the present superconducting synchronous machine can be adapted to magnetize the superconductors 231 to 238 by the same method as that in the first and second embodiments.

Subjecting the superconductors to sufficient magnetization provides a cone-shaped magnetic flux density distribution to the superconductor. At this time, use of spiral type coils has also the effect of rendering the electromotive force of the synchronous machine sinusoidal.

Conversely, the magnetic field formed when a current is passed through the spiral coils generates a cone-shaped magnetic flux density. Since this has the same form of magnetic flux density distribution as that of the above-described superconductor subjected to sufficient magnetization, it has also the effect of being easy to magnetize the superconductor.

As described above, with respect to the armature coils serving as an element of magnetic field generating means and generating a magnetic field equal to or higher than a critical magnetic field in which the intrusion of a magnetic flux into the superconductor starts, around the superconductor cooled down to or below the critical temperature at which the transition to a superconducting state occurs, the disk with superconductors mounted thereon has been enabled to rotate, and the superconductor and the armature coils have been allowed to function as the field magnet and the armature coils of the synchronous machine, respectively. This makes it possible to downsize the induction electromotion/generation type superconducting synchronous machine.

According to the present invention, as described above, a simple and downsized magnetizing device for superconductor can be provided.

Also, the present invention can easily provide a superconducting synchronous machine having the function of magnetizing a superconductor.

Such a superconducting synchronous machine can also be constructed as a superconducting synchronous motor and/or a superconducting induction generator.

Therefore, when attempting to use the superconducting synchronous machine as a superconducting synchronous machine for a small ship, the superconducting synchronous machine is caused to function as a superconducting induction generator during mooring at night, and in turn, using the power source thus charged, the superconducting synchronous machine is caused to function as a superconducting synchronous motor to serve the operation of the ship during daytime, whereby a downsized superconducting synchronous machine can be constructed.

Also, because the magnetic forces of the superconductors can be subjected to continuous monitoring, it is possible to keep high-efficiency inductive electromotion and/or inductive power generation.

Furthermore, according to the superconducting synchronous machine of the present invention, a high torque can be generated by a strong magnetic field. This superconducting synchronous machine is also high in the power conversion efficiency, and thereby it can be significantly reduced in size and weight as compared with conventional superconducting synchronous machines. From the viewpoints of the conservation of the global environment and marine environment, the electric propulsion ship has a great prospect, and the research-and-development and commercialization of POD type electric propulsion ship are progressing in Europe and USA. The present invention, in a high temperature superconducting synchronous machine for a ship that rotates an electric propulsion propeller, enables a combined use of magnetization coils and coreless armature coils, and thereby it can greatly contribute to the design and production thereof.

The present invention is not limited to the above-described embodiments, but various modifications may be made without departing from the true spirit of the present invention. These modifications should be considered to be within the scope of the invention.

As described in detail so far, according to the present invention, the following effects are produced:

(A) a simple and compact magnetizing device for superconductor can be attained;

(B) an inductive motor type superconducting synchronous machine capable of magnetization and electromotive drive can be achieved;

(C) an inductive generator type superconducting synchronous machine capable of magnetization and inductive power generation can be achieved;

(D) when the magnetic force of the superconductor for the superconducting synchronous machine decreases, it is possible to automatically detect it, and perform a mode changeover to the magnetization mode to thereby magnetize the superconductor;

(E) a flat and compact magnetizing device for superconductor or superconducting synchronous machine can be attained;

(F) in the high temperature superconducting synchronous machine for a ship, rotating an electric propulsion propeller, the present invention allows a combined use of magnetization coils and coreless armature coils, and enables the superconducting synchronous machine to be significantly reduced in size and weight, as well as offers an advantage in the conservation of the global environment and marine environment; and (G) when attempting to use the superconducting synchronous machine as a superconducting synchronous machine for a small ship, the superconducting synchronous machine is caused to function as a superconducting induction generator during mooring at night, and in turn, using the power source thus charged, the superconducting synchronous machine is caused to function as a superconducting synchronous motor to serve the operation of the ship during daytime, whereby a downsized superconducting synchronous machine can be constructed. This offers a significant practical effect.

INDUSTRIAL APPLICABILITY

The magnetizing device for superconductor and the superconducting synchronous machine according to the present invention, are especially suitable for a ship prime mover for rotating an electric propulsion propeller, thereby offering an advantage in the conservation of the global environment and marine environment.

The invention claimed is:

1. A magnetizing device for a superconductor, comprising:
a bulk superconductor;
a coolant chamber configured to cool the superconductor down to or below a critical temperature at which the transition to a superconducting state occurs;

magnetic field generating means that generates a magnetic field equal to or higher than a critical magnetic field in which the intrusion of a magnetic flux into the superconductor starts, the magnetic field generating means including a pair of opposed coils fixed so as to sandwich the superconductor such that the central axis of the superconductor is perpendicular to a surface of each coil, the surface of each coil being flat and each coil spirally winding toward the center thereof, the coils generating a conical-shaped magnetic field distribution therebetween; and position modification means capable of modifying the relative positional relationships between the superconductor and the pair of coils.

2. The magnetizing device according to claim 1, wherein the superconductor is a high temperature superconductor arranged on a rotating plate.

3. A superconducting synchronous machine comprising:

a bulk superconductor arranged on a disk;

a coolant chamber configured to cool the superconductor down to or below a critical temperature at which the transition to a superconducting state occurs;

magnetic field generating means that generates a magnetic field equal to or higher than a critical magnetic field in which the intrusion of a magnetic flux into the superconductor starts, the magnetic field generating means including a pair of opposed coils fixed so as to sandwich the superconductor such that the central axis of the superconductor is perpendicular to a surface of each coil, the surface of each coil being flat and each coil spirally winding toward the center thereof, the coils generating a conical-shaped magnetic field distribution therebetween;

an alternating current power source for supplying the magnetic field generating means with a current for driving the superconductor; and a mode changeover switch for performing a changeover between a magnetic field generation mode and an alternating current supply mode.

4. A superconducting synchronous machine comprising:

a bulk superconductor arranged on a disk;

a coolant chamber configured to cool the superconductor down to or below a critical temperature at which the transition to a superconducting state occurs;

magnetic field generating means that generates a magnetic field equal to or higher than a critical magnetic field in which the intrusion of a magnetic flux into the superconductor starts, the magnetic field generating means including a pair of opposed coils fixed so as to sandwich the superconductor such that the central axis of the superconductor is perpendicular to a surface of each coil, the surface of each coil being flat and each coil spirally winding toward the center thereof, the coils generating a conical-shaped magnetic field distribution therebetween;

a prime mover for rotationally driving the disk with the superconductor provided thereon; and a mode changeover switch for performing a changeover between a magnetic field generation mode and a power generation mode.

5. A superconducting synchronous machine comprising:

a bulk superconductor arranged on a disk;

a coolant chamber configured to cool the superconductor down to or below a critical temperature at which the transition to a superconducting state occurs;

magnetic field generating means that generates a magnetic field equal to or higher than a critical magnetic field in which the intrusion of a magnetic flux into the superconductor starts, the magnetic field generating means including a pair of opposed coils fixed so as to sandwich the superconductor such that the central axis of the superconductor is perpendicular to a surface of each coil, the surface of each coil being flat and each coil spirally winding toward the center thereof, the coils generating a conical-shaped magnetic field distribution therebetween;

an alternating current power source for supplying the magnetic field generating means with a current for driving the superconductor;

a prime mover for rotationally driving the disk with the superconductor provided thereon; and a mode changeover switch for performing a changeover among a magnetic field generation mode, an alternating current supply mode, and a power generation mode.

6. The superconducting synchronous machine according to claim 3, 4, or 5, further comprising:

a sensor for detecting the strength of a magnetic field of the superconductor to thereby control the magnetization of the superconductor.

7. The superconducting synchronous machine according to claim 3, 4, or 5, wherein the number of pairs of armature coils is an integral multiple of three; and wherein the number of the superconductors is an integral multiple of two.

8. The superconducting synchronous machine according to claim 3, 4, or 5, wherein the superconductor is a high temperature superconductor.

* * * * *